United States Patent
Damm et al.

(10) Patent No.: US 11,773,917 B2
(45) Date of Patent: Oct. 3, 2023

(54) MULTI-PLATE CLUTCH

(71) Applicant: Hoerbiger Antriebstechnik Holding GmbH, Schongau (DE)

(72) Inventors: Ansgar Damm, Schongau (DE); Sami Oezkan, Schongau (DE); Juergen Binder, Schongau (DE)

(73) Assignee: Hoerbiger Antriebstechnik Holding GmbH, Schongau (DE)

( * ) Notice: Subject to any disclaimer, the term of this patent is extended or adjusted under 35 U.S.C. 154(b) by 0 days.

(21) Appl. No.: 18/050,205

(22) Filed: Oct. 27, 2022

(65) Prior Publication Data

US 2023/0132839 A1 May 4, 2023

(30) Foreign Application Priority Data

Oct. 28, 2021 (DE) .......................... 102021128180.6

(51) Int. Cl.
*F16D 13/52* (2006.01)
*F16D 13/64* (2006.01)

(52) U.S. Cl.
CPC .......... *F16D 13/52* (2013.01); *F16D 13/648* (2013.01)

(58) Field of Classification Search
CPC ........ F16D 13/52; F16D 13/648; F16D 13/70; F16H 7/027
See application file for complete search history.

(56) References Cited

U.S. PATENT DOCUMENTS

| | | | | |
|---|---|---|---|---|
| 5,794,751 A | * | 8/1998 | Kerendian | .......... F16D 25/0638 192/85.42 |
| 2008/0217133 A1 | * | 9/2008 | Ikeda | ...................... F16D 13/70 192/70.11 |
| 2009/0057087 A1 | * | 3/2009 | Oh | ........................ F16D 13/648 192/3.57 |
| 2011/0147158 A1 | * | 6/2011 | Schaefer | ................. F16D 13/69 192/107 C |
| 2020/0400201 A1 | * | 12/2020 | Oezkan | ................... F16D 13/75 |

FOREIGN PATENT DOCUMENTS

DE  102019007951 A1 * 5/2021

* cited by examiner

*Primary Examiner* — Stacey A Fluhart
(74) *Attorney, Agent, or Firm* — McNees Wallace & Nurick LLC

(57) ABSTRACT

A multi-plate clutch is disclosed, including an outer plate carrier, an inner plate carrier, and a set of plates of alternately arranged radially between the outer plate carrier and the inner plate carrier and which is delimited by two end plates engaging at opposite ends of the set of plates, wherein each end plate rests against an annular axial supporting contour on the end face facing away from the set of plates, wherein the supporting contours differ in their effective diameter at which the supporting contours contact the associated end plate, and wherein the supporting contours apply an axial force on the set of plates such that the plates are elastically deformed into a conical shape.

11 Claims, 1 Drawing Sheet

MULTI-PLATE CLUTCH

TECHNICAL FIELD

The disclosure relates to a multi-plate clutch, for example for an electric drive train of a motor vehicle.

BACKGROUND

Multi-plate clutches include a plurality of friction plates arranged axially one behind the other. They serve to transmit a torque between two shafts in a frictionally engaged manner. In one case of application, multi-plate clutches can serve as a passive transmission element, wherein a torque which can be transmitted between a driven input shaft and a coaxially arranged output shaft is limited. In this case, no active actuation of the multi-plate clutch is provided, for example by a hydraulic piston or other type of force application. The maximum transmittable torque is also referred to as the triggering torque. By limiting the torque within the multi-plate clutch, the components in a drive train can be protected from damage due to excessive loads.

The friction plates are usually preloaded against each other, for example by means of a spring element. The preload adjusts the torque or frictional torque within the multi-plate clutch.

It is an object of the disclosure to optimize the adjustment of the preload force.

SUMMARY

A multi-plate clutch according to the disclosure comprises an outer plate carrier, an inner plate carrier and a set of plates of alternately arranged outer plates and inner plates, which is arranged radially between the outer plate carrier and the inner plate carrier and which is delimited by two end plates engaging at opposite ends of the set of plates, wherein each end plate rests against an annular axial supporting contour on the end face facing away from the set of plates, and wherein the supporting contours differ in their effective diameter at which they contact the associated end plate, and wherein the supporting contours apply an axial force on the set of plates such that the plates are elastically deformed into a conical shape.

The effective diameter denotes in particular the mean diameter of the annular contact surface of the supporting contour with the end plate.

The annular supporting contour does not necessarily have to be circular and continuous, it is also conceivable that the supporting structure is elliptical and/or corrugated and/or has interruptions.

The multi-plate clutch according to the disclosure has the advantage that the set of plates itself functions as a spring pack. In particular, the individual plates are preloaded against each other due to the conical preloading. Thus, a spring to preload the set of plates can be omitted. The elastic preloading of the set of plates is caused by the different effective diameters of the supporting contours. The axes of the force application are arranged coaxially to each other and centrically to an axis of rotation of the plates.

According to one embodiment, one of the supporting contours rests against the end plate in the radial direction in the area of the radially outer third, in particular quarter, of the outer diameter of the outer plates, and the other supporting contour rests against the set of plates in the area of an inner third, in particular quarter, of the inner diameter of the outer plates. In this way, the greatest possible lever arm is achieved, resulting in a particularly effective preloading of the set of plates.

The contact surfaces of the supporting contours are preferably positioned such that each contact surface, as seen in the axial direction, overlaps completely with the inner plate or outer plate.

Particularly preferably, one of the supporting contours is directly adjacent to the outer core diameter of the outer plates, and/or the other supporting contour is adjacent to the inner core diameter of the outer plates.

For example, at least one of the annular supporting contours is formed on a separate supporting ring. This simplifies the assembly of the multi-plate clutch.

The supporting ring can be guided with the outer diameter thereof on the outer plate carrier. In this way, the supporting ring can be positioned particularly easily. More precisely, the supporting ring is automatically centered in the outer plate carrier.

For example, the supporting ring has at its radially inner edge a collar which is bent towards the set of plates and by means of which it rests against the end plate. This allows the contact surface of the supporting ring to be flexibly positioned at a distance from an inner wall of the outer plate carrier.

According to one embodiment, the outer plate carrier is pot-shaped and the supporting contour is formed as a supporting ring which is received in the outer plate carrier and is axially fixed to the outer plate carrier by means of a fixing element. The fixing element is, for example, a retaining ring. The set of plates can thus be received and fixed in the outer plate carrier, the outer plate carrier forming a housing of the multi-plate clutch. In this way, a compact design of the multi-plate clutch is achieved.

One of the two supporting contours can be integrally formed in the outer plate carrier, in particular on an axial wall of the outer plate carrier directed towards the set of plates. This reduces the number of components of the multi-plate clutch, which simplifies the assembly of the multi-plate clutch.

According to one embodiment, the supporting contour is a raised portion in the outer plate carrier. This makes it particularly easy to demold the supporting contour in the outer plate carrier.

The resting surface of the supporting contours on the plates is preferably at most one fifth of the end face of the plates. In this way, a particularly purposeful introduction of force into the set of plates is possible. If the area of the supporting contours were too large, the plates would only be pressed axially against each other and not conically clamped.

DETAILED DESCRIPTION

Figure 1:
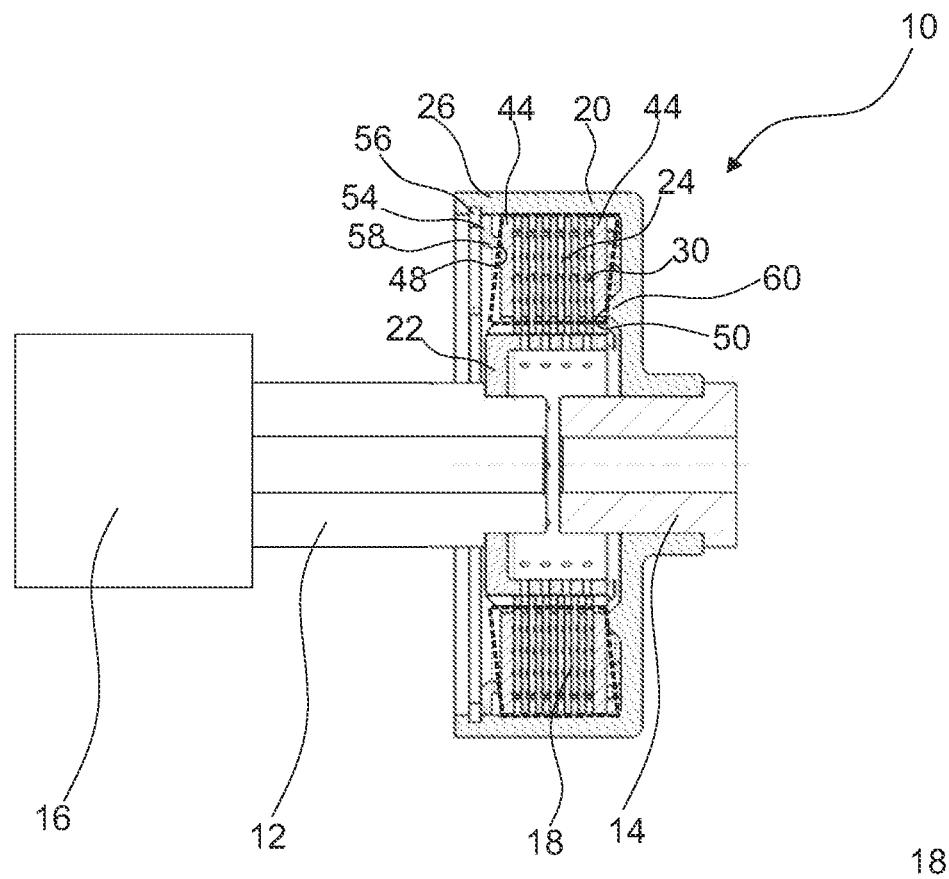
FIG. 1 shows an electric drive train with a multi-plate clutch according to the disclosure.

FIG. 1 shows, partly schematically, an electrically operated drive train 10 in a sectional view.

The electrically operated drive train 10 comprises an input shaft 12 and an output shaft 14 which is arranged coaxially with the input shaft 12, and an electric machine 16.

The electric machine 16 can be operated as a motor or as a generator.

The electric machine 16 drives the input shaft 12 of the drive train 10.

The output shaft 14 is used, for example, to drive a drive axle or an input shaft of a transmission.

The input shaft 12 and the output shaft 14 are connected by a multi-plate clutch 18 for transmitting a torque.

Figure 2:
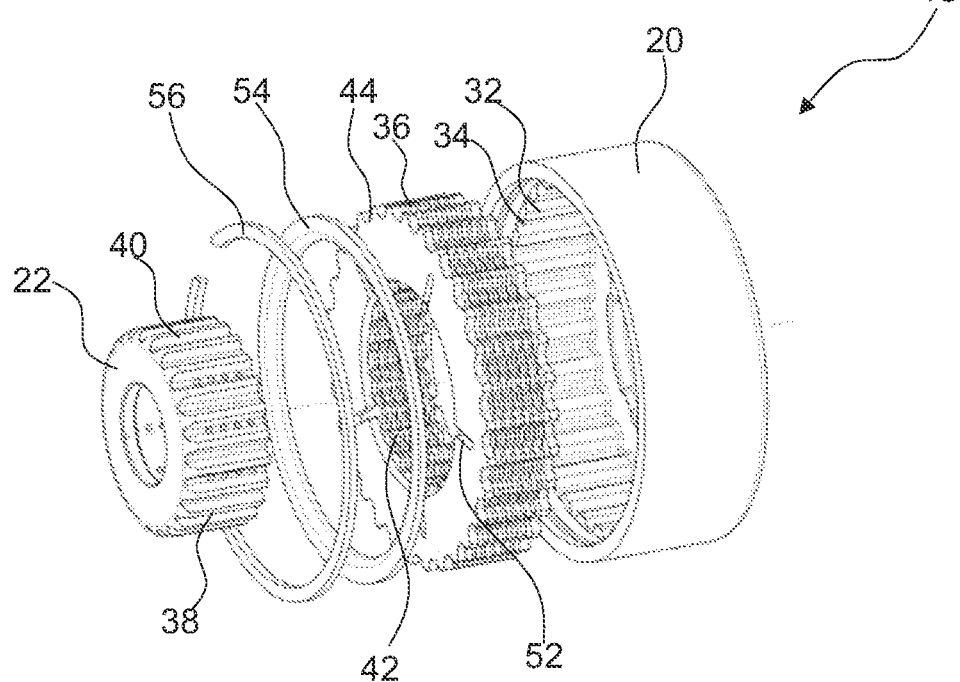
FIG. 2 shows an exploded view of the multi-plate clutch according to the disclosure of FIG. 1.

The multi-plate clutch 18 is shown in an exploded view in FIG. 2.

The multi-plate clutch 18 serves to limit the maximum transmittable torque between the input shaft 12 and the output shaft 14. By limiting the torque, the components of the drive train 10 are protected from damage due to excessive load.

The multi-plate clutch 18 comprises a plurality of friction plates arranged axially one behind the other, which are in particular made of steel.

More specifically, the multi-plate clutch 18 comprises an outer plate carrier 20 and an inner plate carrier 22, and a set of plates 24 arranged radially between the outer plate carrier 20 and the inner plate carrier 22.

The set of plates 24 has alternately arranged outer plates 26 and inner plates 30.

The outer plate carrier 20 is configured to be pot-shaped and forms a housing of the multi-plate clutch 18 in which the set of plates 24 is accommodated.

In the example embodiment, the outer plate carrier 20 is connected to the output shaft 14 in a rotationally fixed manner.

In the example embodiment, the inner plate carrier 22 is connected to the input shaft 12 in a rotationally fixed manner.

The outer plates 26 are in toothed engagement with the outer plate carrier 20. The inner plates 30 are in toothed engagement with the inner plate carrier 22.

For this purpose, grooves 34 are provided along an inner wall 32 of the outer plate carrier 20, which extend in the axial direction and in which the teeth 36 of the outer plates 26 are received.

Similarly, grooves 40 are provided along an outer wall 38 of the inner plate carrier 22, which extend in the axial direction and in which the teeth 42 of the inner plates 30 are received.

The outer plates 26 and inner plates 30 of the set of plates 24 are preloaded against each other. The preload force creates a frictional connection between the input shaft 12 and the output shaft 14. In particular, the preload force determines the torque or friction torque within the set of plates 24.

According to the disclosure, the preload is achieved by each end plate 44 resting against an annular axial supporting contour 48, 50 on the end face 46 facing away from the set of plates 24, the supporting contours differing in their effective diameter at which they contact the associated end plate 44.

The supporting contours 48, 50 apply an axial force on the set of plates 24 such that the plates 26, 30 are elastically deformed into a conical shape.

The conical shape assumed by the set of plates 24 is shown only schematically in FIG. 1 as a superimposed dashed line for better illustration.

The end plates 44 of the set of plates 24, which terminate at the end face, are preferably thicker than the other plates 26, 30. This serves to distribute the preload forces within the set of plates 24 evenly over the friction surfaces.

To prevent an undesired deformation of the end plates 44 under thermal load, they can have a plurality of interruptions distributed around the circumference, in particular slots 52 (see FIG. 2).

As can be seen particularly well in the sectional view in FIG. 1, one of the supporting contours 48 rests against the end plate 44 in the radial direction in the area of the radially outer third, in particular quarter, of the outer diameter of the outer plates 26.

The further supporting contour 50 rests against the set of plates 24, in particular the end plate 44, in the area of an inner third, in particular a quarter, of the inner diameter of the outer plates 26.

Both supporting contours 48, 50 rest against the end plate 44 over the entire surface.

The resting surface of the supporting contours 48, 50 on the end plates 44 is at most one fifth of the end surface of the end plates 44.

One of the two supporting contours 48 is formed on a separate supporting ring 54.

The supporting ring 54 is guided with its outer diameter on the outer plate carrier 20, in particular on the inner wall 32 of the outer plate support 20.

The supporting ring 54 is thus received in the outer plate carrier 20.

A fixing element 56 is furthermore provided, by means of which the supporting ring 54 is axially fixed to the outer plate carrier 20.

At its radially inner edge, the supporting ring 54 has a collar 58 which is bent towards the set of plates 24 and by means of which it rests against the end plate 44.

The supporting contour 48 is arranged on one end face of the collar 58.

The further supporting contour 50 is integrally formed in the outer plate carrier 20, more specifically on an axial wall of the outer plate carrier 20 directed towards the set of plates 24.

In the example embodiment, the supporting contour 50 is a raised portion 60 in the outer plate carrier 20.

During operation of the multi-plate clutch, if the maximum transmittable torque is exceeded, the outer plates 26 coupled to the outer plate carrier 20 can twist relative to the inner plates 30 connected to the inner plate carrier 22. As a result, a differential speed between the two shafts 12, 14 is possible for a short time. The resulting friction torque between the friction plates reduces this differential speed again when the maximum transmittable torque is undershot and restores the equality of the shaft speeds. The clutch is thus also capable of damping short-term shocks or vibrations in the drive train which are above the maximum transmittable torque of the multi-plate clutch 18.

To achieve a particularly good friction behavior, the friction surfaces of the outer plates 26 and/or the inner plates 30 are structured. For example, grooves are provided on the friction surfaces in which oil can be guided. Alternatively, it is also conceivable that the friction surfaces are chemically and/or mechanically and/or thermally processed to produce a defined surface roughness. Due to the structuring, a friction lining can be dispensed with.

The invention claimed is:

1. A multi-plate clutch, the multi-plate clutch being a passive transmission element, comprising:
   an outer plate carrier;
   an inner plate carrier;
   a driven input shaft;
   a driven output shaft being arranged coaxially to the driven input shaft; and a set of plates of alternately arranged outer plates and inner plates, which is arranged radially between the outer plate carrier and the inner plate carrier and which is delimited by two end plates engaging at opposite ends of the set of plates, wherein each end plate rests against an annular axial supporting contour on the end face facing away from the set of plates, wherein the supporting contours differ in their effective diameter at which the supporting contours contact the associated end plate, wherein the supporting contours apply an axial force on the set of plates such that the plates are elastically deformed into a conical shape, wherein a torque which can be transmitted between the driven input shaft and the coaxially arranged output shaft is limited, and wherein no active actuation of the multi-plate clutch is provided.

2. The multi-plate clutch according to claim 1, wherein one of the supporting contours rests against the end plate in the radial direction in the area of the radially outer third of the outer diameter of the outer plates, and in that the further supporting contour rests against the set of plates in the area of an inner third of the inner diameter of the outer plates.

3. The multi-plate clutch according to claim 1, wherein one of the supporting contours rests against the end plate in the radial direction in the area of the radially outer quarter of the outer diameter of the outer plates, and in that the further supporting contour rests against the set of plates in the area of an inner quarter of the inner diameter of the outer plates.

4. The multi-plate clutch according to claim 1, wherein at least one of the annular supporting contours is formed on a separate supporting ring.

5. The multi-plate clutch according to claim 4, wherein the supporting ring is guided with the outer diameter thereof on the outer plate carrier.

6. The multi-plate clutch according to claim 4, wherein the supporting ring has at its radially inner edge a collar which is bent towards the set of plates and by which it rests against the end plate.

7. The multi-plate clutch according to claim 1, wherein the outer plate carrier is pot-shaped and the supporting contour is formed as a supporting ring which is received in the outer plate carrier and is axially fixed to the outer plate carrier by a fixing element.

8. The multi-plate clutch according to claim 1, wherein one of the two supporting contours is integrally formed in the outer plate carrier.

9. The multi-plate clutch according to claim 8, wherein one of the two supporting contours is integrally formed on an axial wall of the outer plate carrier directed towards the set of plates.

10. The multi-plate clutch according to claim 8, wherein the supporting contour is integrally formed in the outer plate carrier.

11. The multi-plate clutch according to claim 1, wherein the resting face of the supporting contours on the plates is at most one fifth of the end face of the plates.

* * * * *